US005207550A

United States Patent [19]

Lehman

[11] Patent Number: 5,207,550

[45] Date of Patent: May 4, 1993

[54] DRUM HANDLER

[75] Inventor: Marcus S. Lehman, Lake City, Minn.

[73] Assignee: Valley Craft, Lake City, Minn.

[21] Appl. No.: 957,741

[22] Filed: Oct. 7, 1992

Related U.S. Application Data

[63] Continuation of Ser. No. 669,039, Mar. 14, 1991, abandoned.

[51] Int. Cl.[5] .......... B65G 65/24

[52] U.S. Cl. .......... 414/420; 414/421; 414/607; 414/641

[58] Field of Search .......... 414/419–421, 414/444, 446, 448–449, 490, 590, 607–608, 620, 628–629, 640–641

[56] References Cited

U.S. PATENT DOCUMENTS

| | | | |
|---|---|---|---|
| 2,507,583 | 5/1950 | Wellman | 414/421 X |
| 3,191,288 | 6/1965 | Hopfeld | 414/420 |
| 3,306,479 | 2/1967 | Hopfeld | 414/421 X |
| 3,587,892 | 6/1971 | Vermette | 414/420 |
| 3,971,485 | 7/1976 | Hoppey | 414/420 |
| 4,318,661 | 3/1982 | Helm | 414/607 |
| 4,618,306 | 10/1986 | Dorsch | 414/607 X |
| 4,797,050 | 1/1989 | Habicht | 414/420 |
| 4,921,389 | 5/1990 | O'Daniel | 414/421 X |
| 5,009,565 | 4/1991 | Esau | 414/421 X |

FOREIGN PATENT DOCUMENTS

| | | | |
|---|---|---|---|
| 1386538 | 4/1988 | U.S.S.R. | 414/620 |
| 0659743 | 10/1951 | United Kingdom | 414/449 |

OTHER PUBLICATIONS

1988 Brochure of Applicant's assignee entitled "Straddle Lift", 1988.

Little Giant Products, Inc. Brochure #9388 Jan., 1975.

*Primary Examiner*—Michael S. Huppert
*Assistant Examiner*—James Keenan
*Attorney, Agent, or Firm*—Merchant, Gould, Smith, Edell, Welter & Schmidt

[57] ABSTRACT

A drum handler is provided for manipulating drums of known dimensions. The handler includes a frame and carriage attached to the frame to move along a vertical line of travel. A lift drive is provided for moving the carriage along the line of travel. A drum engagement is carried on the carriage for movement therewith. The drum engagement member includes mechanism for gripping a drum. A rotary drive is provided for rotating the gripping member about a generally horizontal axis.

5 Claims, 5 Drawing Sheets

DRUM HANDLER

This is a continuation, of application Ser. No. 07/669,039, filed Mar. 14, 1991, now abandoned.

BACKGROUND OF THE INVENTION

1. Field of the Invention

This invention pertains to a drum handler for handling drums of predetermined dimensions. More particularly, this invention pertains to a drum handler having means for lifting and rotating a drum.

2. Description of the Prior Art

In the prior art, numerous devices have been proposed to assist in the handling of conventional drums. For example, U.S. Pat. No. 3,971,485 teaches a forklift attachment with clamping jaw members which rotate a drum.

In providing drum handlers for warehouse use and the like, it is desirable that the drum handler be low cost and easy to manufacture and use. It is an object of the present invention to provide a low cost drum handler.

SUMMARY OF THE INVENTION

According to a preferred embodiment of the present invention, a drum handler is provided for manipulating drums of predetermined dimensions. The drum handler includes a frame member with a transport means for moving the frame member to a desired position on a work floor. A carriage is provided attached to the frame to move along a vertical line of travel. A lift drive is provided for moving the carriage along the line of travel. A drum engagement member is provided carried on the carriage for movement therewith. The drum engagement member includes a gripping member for a drum of the predetermined dimensions. Rotary drive means are provided for rotating the gripping member about a generally horizontal axis.

DESCRIPTION OF THE PREFERRED EMBODIMENT

Figure 1:
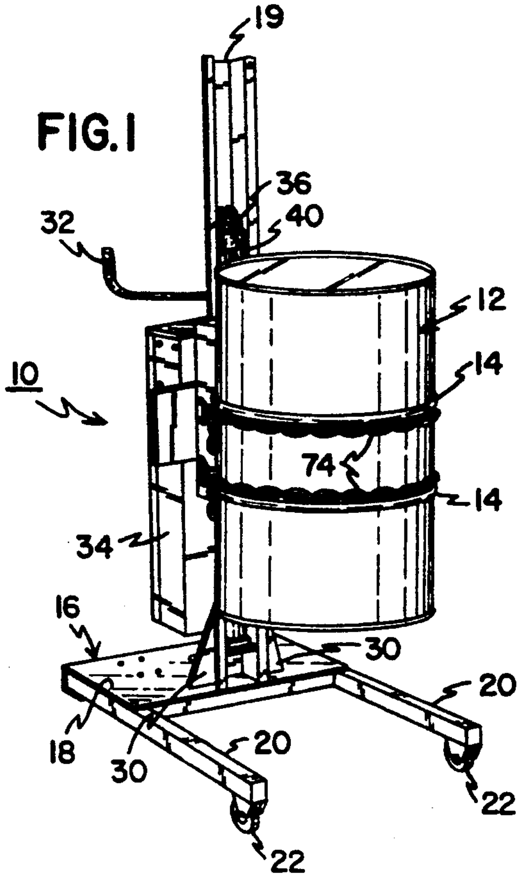
FIG. 1 is a perspective view of a drum handler according to the present invention shown holding a drum with a drum access being vertical.
Figure 2:
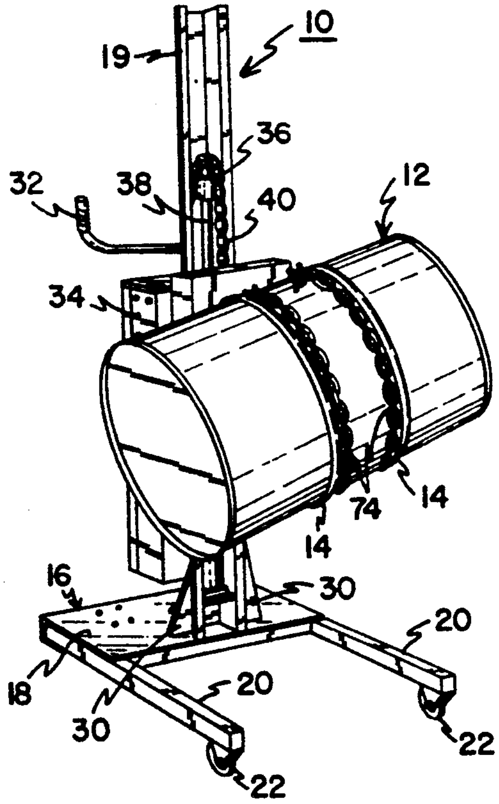
FIG. 2 is the view of FIG. 1 showing the drum handler rotating the drum off a vertical axis.

With reference to the various drawing figures in which identical elements are numbered identically throughout, a description of the preferred embodiment will now be provided. As shown in FIG. 1, a drum handler 10 is shown for handling and manipulating a conventional drum (such as a 55 gallon drum 12). The drum 12 is generally cylindrical of generally known predetermined dimensions. Commonly, such drums are formed of steel and include centrally disposed ring portions 14.

The drum handler 10 includes a frame 16 which includes a platform 18. Platform 18 rests on support rails 20.

Figure 3:
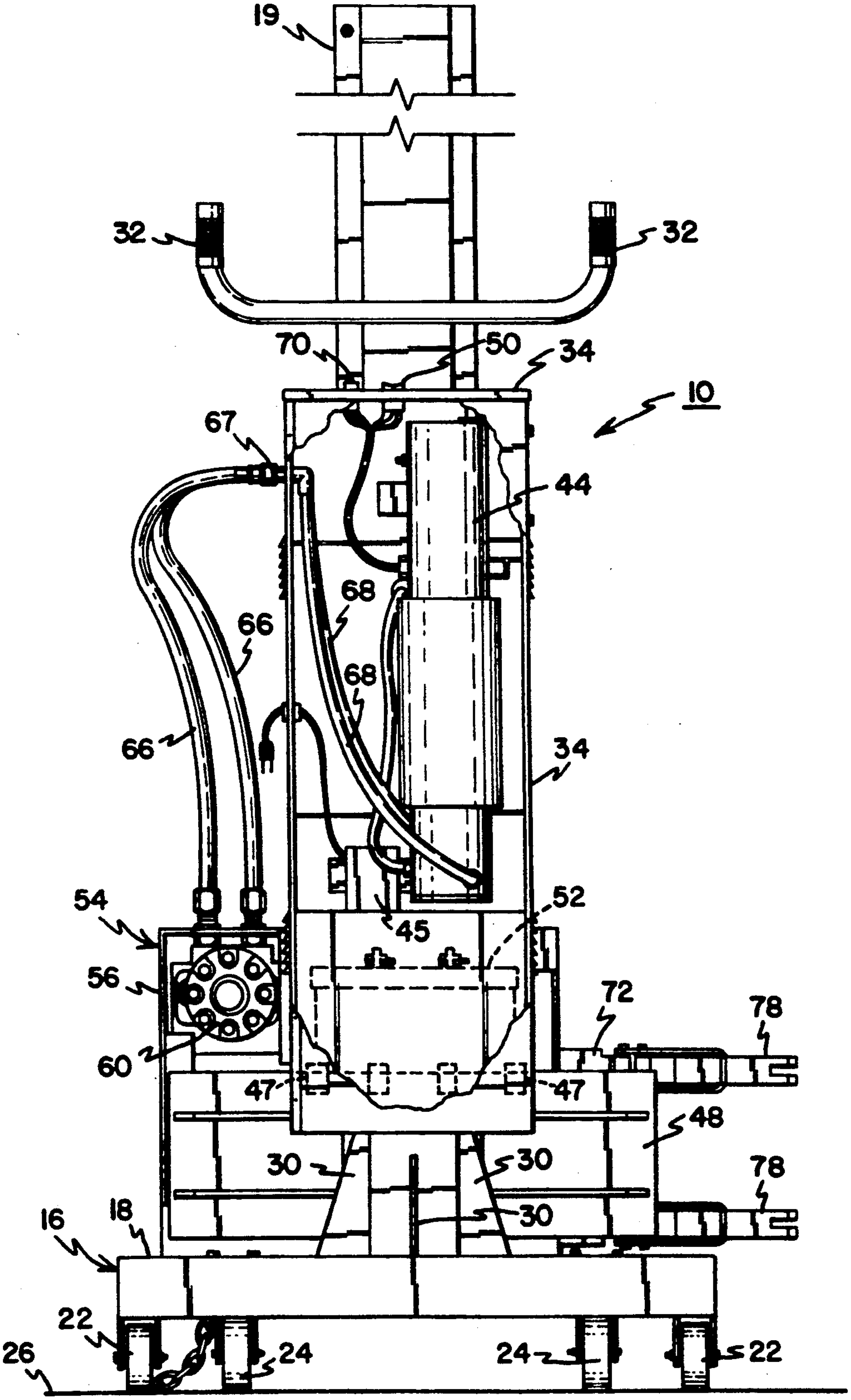
FIG. 3 is a rear elevation view of the drum handler of FIG. 1 with a cover plate partially removed.
Figure 4:
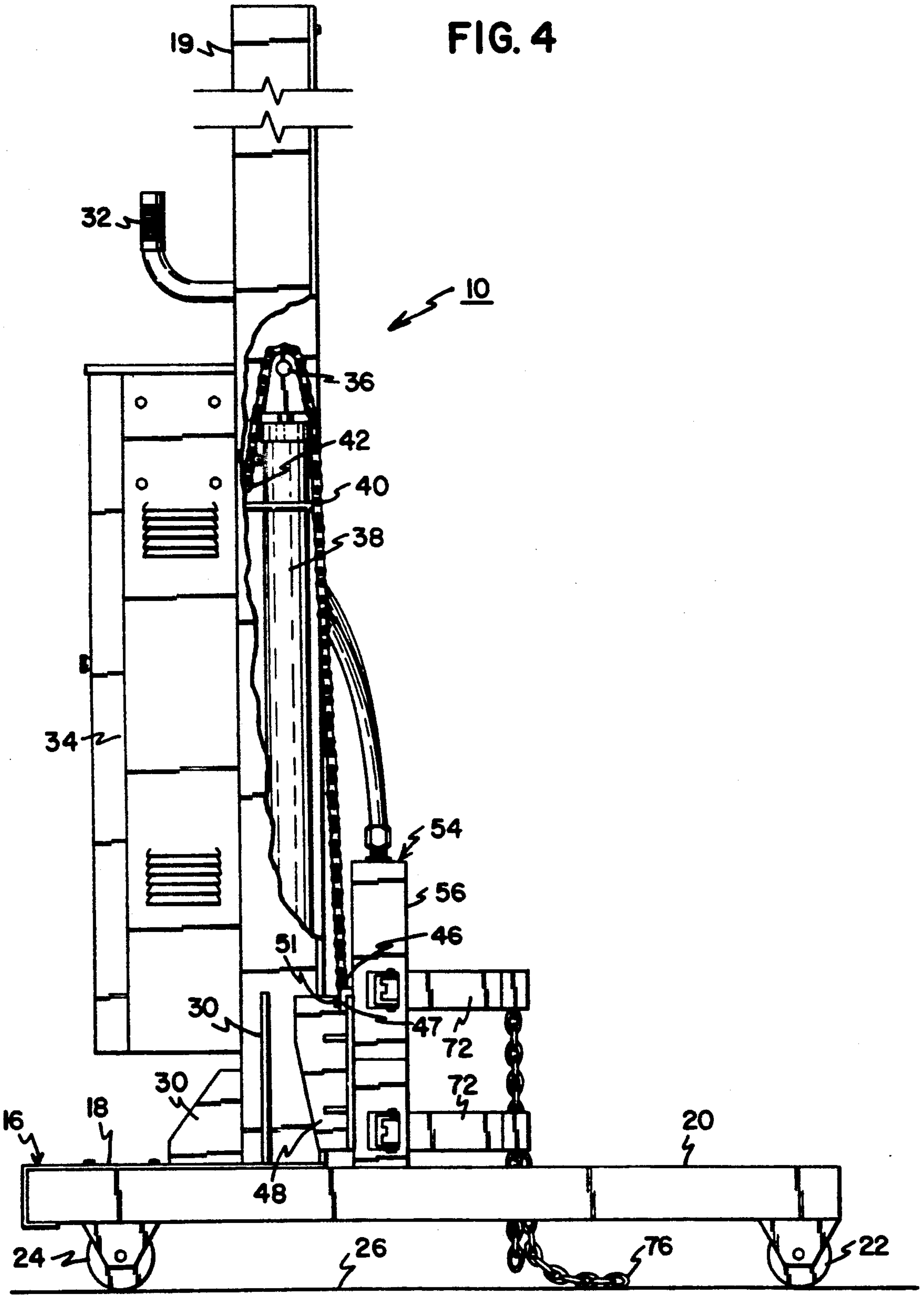
FIG. 4 is a side elevation view of the drum handler of FIG. 1 with a portion of a mast partially removed.
Figure 5:
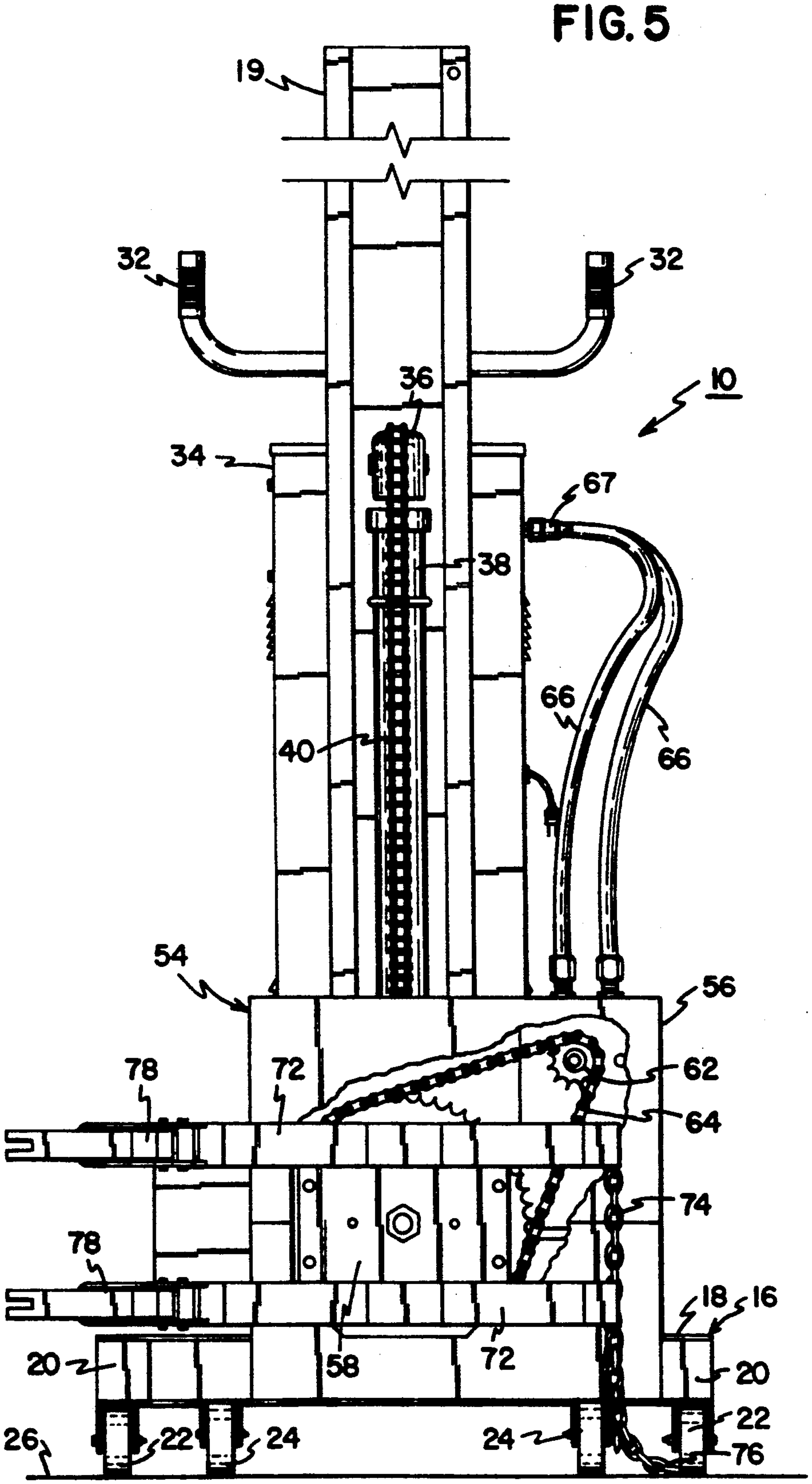
FIG. 5 is a front elevation view of the drum handler of FIG. 1 with a housing of a drum engagement member partially removed.
Figure 6:
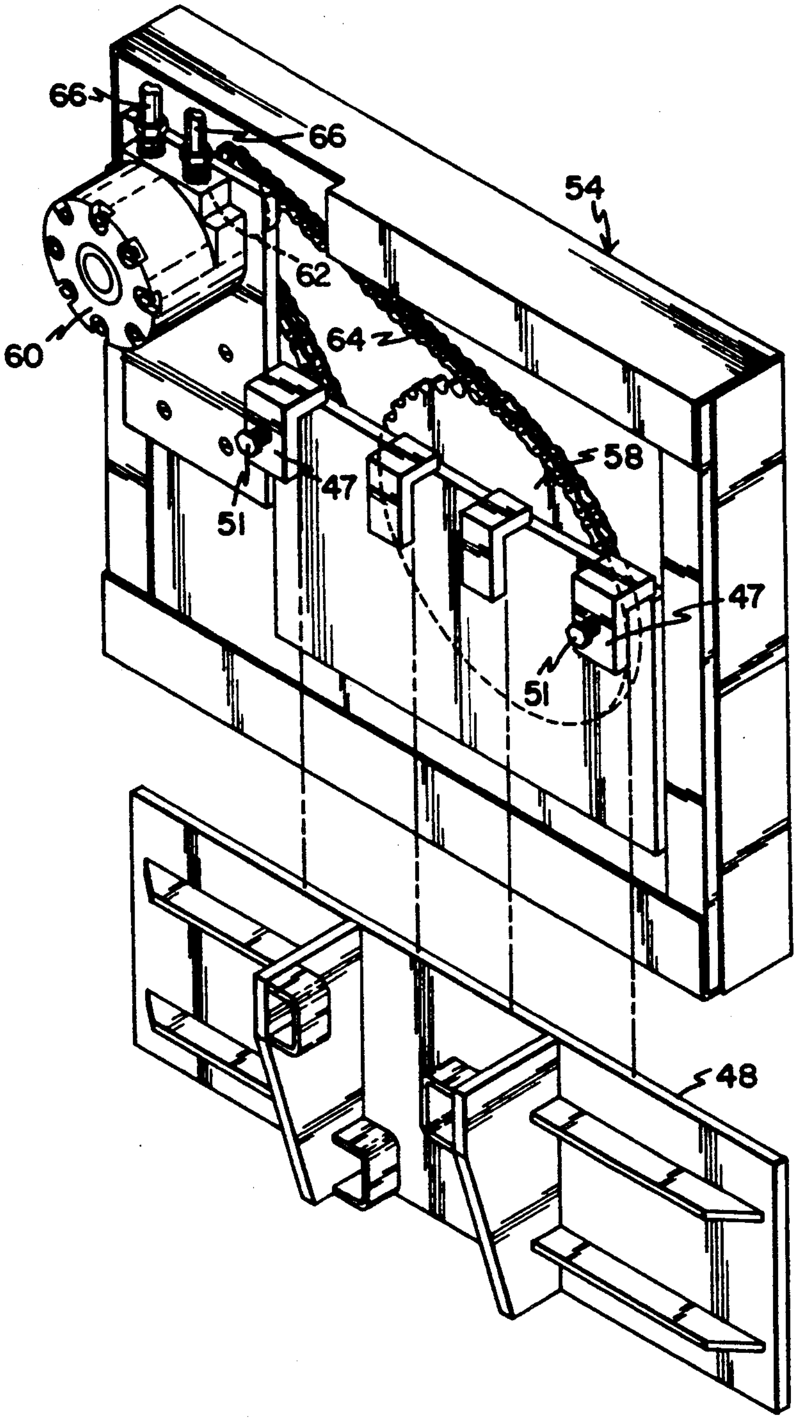
FIG. 6 is a perspective exploded view of a carriage and drum engagement member.

Front and rear wheels 22,24, respectively, are provided as a transport mechanism for permitting movement of the frame 16 along a work surface 26 (shown in FIGS. 3–5). In a preferred embodiment, front wheels 22 are fixed in parallel alignment. Preferably, rear wheels 24 are swivel casters so that an operator can turn the frame 16 at will.

A mast 19 in the form of a U-shaped channel is provided secured to platform 18, and supported by gussets 30. The mast 19 extends in a vertical direction with the U-shape of the mast 19 opening in a forward direction of the drum handler 10. Operator engageable handles 32 are secured to mast 19 and positioned to be engaged by an operator who can grasp handles 32 to push the frame 16 along the work surface 26. A control box 34 is mounted on the rear of the mast 19.

Disposed within U-shaped mast 19 is a sprocket 36 supported by a support post 38. A chain 40 is entrained around sprocket 36 with a first end 42 (FIG. 4) connected to a hydraulic lift motor 44 (FIG. 3) housed within control box 34. It will be appreciated that means for connection of a chain such as chain 42 to the hydraulic motor, such as motor 44, is well known in the art and forms no part of this invention per se. Accordingly, details of the connection are not shown.

A second end 46 (FIG. 4) of chain 40 is connected to a carriage 48. Carriage 48 is mounted to U-shaped mast 19 to permit carriage 48 to move vertically on mast 19. As a result, operation of motor 44 can permit the chain to raise or lower the carriage 48 by reason of an operator engaging a control button 50 (FIG. 3). A battery 52 is housed within control box 34 to power hydraulic motor 44. An electrical transformer 45 is housed in control box 34. Transformer 45 recharges battery 52.

A drum engagement member 54 is connected to carriage 48 for movement therewith. The drum engagement member 54 includes a box-shaped housing 56, the forward panel of which is partially exposed in FIG. 5.

Drum engagement member 54 may be removed and completely disconnected from carriage 48. L-shaped mounting brackets 47 on a back of member 54 are positioned to rest on an upper edge 49 of carriage 48. As a result, the member 54 may be simply lifted off of carriage 48. Locking screws 51 carried on at least a portion of brackets 47 are provided for locking the member 54 onto carriage 49.

A main sprocket 58 is mounted within housing 56 for rotation about a generally horizontal axis. A rotary hydraulic motor 60 (see FIG. 3) is also mounted within housing 56. Motor 60 has a sprocket 62 (see FIG. 5) which rotates about a horizontal axis. A chain 64 entrained around both sprockets 62,58 provides motive power communication between motor 60 and sprocket 58. Flexible hydraulic conduits or hosing 66 connect the hydraulic motor 60 to hosing 68 within housing 34. Hosing 66 is connected to hosing 68 at quick connect and disconnect connections 67 (to permit member 54 to be completely removed from carriage 48). The hosing 68 connects the motor 60 hydraulically to hydraulic motor 44. As a result, by engaging a control button 70 an operator may energize motor 60 causing it to rotate in any desired direction with resulting rotation of sprocket 58.

Metallic straps 72 are mounted on main sprocket 58 for rotation therewith. Straps 72 are generally arcuate to conform with the exterior cylindrical surface of drum 12. Each of straps 72 is provided with a chain 74 having a free end 76 which may be captured on a latch mechanism 78 carried on straps 72. Operation of the latch mechanism 78 permits an operator to tighten a chain 74 around a drum 12 to accommodate drums of various diameters. It will be appreciated that chains and latching mechanisms are known in the art and form no part of this invention per se.

As a result of the construction thus described, an inexpensive drum handler is provided for handling a wide variety of drums of predetermined sizes. By attaching a drum 12 to drum engagement member 54 via straps 72 and chains 74, an operator can raise or lower the drum by energizing motor 44 to raise or lower chain 40. Alternatively, an operator can rotate the drum (for pouring and the like) by rotating sprocket 58.

From the foregoing detailed description of the present invention, it has been shown how the present invention has been attained in a preferred embodiment. However, modifications and equivalents of the disclosed concepts, such as those which would readily occur to one skilled in the art, are intended to be included within the scope of the present invention.

What is claimed is:

1. A drum handler for manipulating drums, said handler comprising:

a manually engagable frame member (18) having roller means for said frame to be manually moved about a surface and having manually engagable handles for an operator to engage and urge said member about said surface;

a carriage (48);

attachment means for attaching said carriage to said frame for said carriage to move along a vertical line of travel;

lift drive means connected to said frame for moving said carriage along said line of travel;

a source (44) of pressurized hydraulic fluid including a first hydraulic motor, said source (44) connected to said frame member (18), for movement therewith, electrical power means carried on said frame for powering said first hydraulic motor; said electrical power means including electrical power storage means and means for releasably connecting said storage means to an external power source to recharge said storage means;

a modular drum engagement member (54) releasably connected to said carriage (48), said drum engagement member including gripping means for gripping a drum;

said drum engagement member (54) including hydraulic actuator means carried on said drum engagement member (54) to rotate said gripping means about a generally horizontal axis, said rotary actuator means including a second hydraulic motor (60) connected to said drum engagement member (54) and removable from said carriage (48) with said drum engagement member;

hydraulic fluid coupling means (66) for releasably connecting said second hydraulic motor (60) to said source (44) of pressurized hydraulic fluid throughout movement of said carriage through said line of travel.

2. A drum handler according to claim 1 wherein said drum rotary means rotates said gripping means 360° about said axis.

3. A drum handler according to claim 1 wherein said coupling means includes flexible hydraulic conduits.

4. A drum handler according to claim 1 wherein said frame member includes a platform with means for traversing a work floor and a mast extending vertically from said platform, said carriage secured to said mast for movement on said mast.

5. A drum handler according to claim 1 wherein said mast is a generally open channel having a sprocket disposed within said channel and a chain entrained on said sprocket with a first end connected to said carriage and a second end operably connected to said first hydraulic motor carried on said frame.

* * * * *